United States Patent [19]

Wakahara et al.

[11] Patent Number: 5,651,752
[45] Date of Patent: Jul. 29, 1997

[54] LOCK-UP CONTROL SYSTEM FOR AUTOMATIC TRANSMISSION

[75] Inventors: Tatsuo Wakahara, Kawasaki; Koichi Hayasaki, Ebina, both of Japan

[73] Assignee: Nissan Motor Co., Ltd., Yokohama, Japan

[21] Appl. No.: 417,045

[22] Filed: Apr. 4, 1995

[30] Foreign Application Priority Data

Apr. 5, 1994 [JP] Japan .................................. 6-066981

[51] Int. Cl.$^6$ .................................................. F16H 45/00
[52] U.S. Cl. ............................ 477/181; 477/110; 477/62; 477/175
[58] Field of Search ................................ 477/110, 109, 477/166, 168, 169, 175, 181, 62, 63

[56] References Cited

U.S. PATENT DOCUMENTS

| | | | |
|---|---|---|---|
| 4,484,497 | 11/1984 | Hibino | 477/169 |
| 4,881,627 | 11/1989 | Ishii | 477/168 |
| 4,944,199 | 7/1990 | Okino et al. | 477/109 X |
| 5,141,089 | 8/1992 | Nobumoto et al. | 477/169 |
| 5,201,250 | 4/1993 | Kato et al. | 477/109 |

FOREIGN PATENT DOCUMENTS

| | | | |
|---|---|---|---|
| 4030811 | 4/1992 | Germany | 477/168 |
| 402129459 | 5/1990 | Japan | 477/169 |
| 402118265 | 5/1990 | Japan | 477/168 |
| 403262734 | 11/1991 | Japan | 477/175 |
| 2189294 | 10/1987 | United Kingdom | 477/169 |

OTHER PUBLICATIONS

"Service Manual for RE4R01A–Type Automatic Transmission", Nissan Motor Co., Ltd., 1987, Part I, pp. 13–14, 28–30 and 74–75.

*Primary Examiner*—Khoi Q. Ta
*Attorney, Agent, or Firm*—Foley & Lardner

[57] ABSTRACT

A lock-up controller of a lock-up control system reads-in a vehicle speed V, a throttle opening degree TVO, an engine speed Ne, and a turbine speed Kt from sensors and outputs a fuel-out command and a fuel-supply restart command to an engine controller, to operate a lock-up clutch in a torque converter of an automatic transmission for an automotive vehicle in an accelerator-off (coasting) state of the vehicle. The lock-up control system makes it possible to realize locking-up of the torque converter providing an improved fuel consumption ratio of the engine and a large braking force from the engine, even when a vehicle speed increases due to running down a downward slope while the accelerator-off state continues, or when an up-shifting speed change occurs due to the accelerator-off state.

5 Claims, 5 Drawing Sheets

FIG_1

FIG. 2

FIG_4

FIG_5

LOCK-UP CONTROL SYSTEM FOR AUTOMATIC TRANSMISSION

BACKGROUND OF THE INVENTION

1. Field of the invention

The present invention relates generally to a control system for an automatic transmission of an automotive vehicle, which transmission having a fluid drive device with a lock-up clutch and being associated with an engine of the vehicle capable of controlling an amount of fuel supplied apart from an accelerator pedal stepping degree. More particularly, the present invention relates to an improved control system for the lock-up clutch of the fluid drive device, which system being capable of realizing lacking-up of the fluid drive device under an accelerator-off state.

2. Description of the Related Art

In a known automotive vehicle mounted with an automatic transmission having a fluid drive device (e.g. torque converter) with a lock-up clutch for locking-up the fluid drive device by mechanically engaging between input and output elements of the fluid drive device with a lock-up operation of the lock-up clutch, a lock-up area for the lock-up operation of the lock-up clutch is determined in relation to a vehicle speed and a throttle valve opening degree, so as to obtain an improved fuel consumption ratio of an engine of the vehicle and a large braking force from the engine.

On the other hand, in a known automotive vehicle mounted with an engine having a fuel-cut device, a fuel-cut operation for cutting fuel-supply for the engine is performed by the fuel-cut device after the vehicle is in an accelerator-off state, i.e. an accelerator pedal being fully released (causing fully closed state of a throttle valve), in accordance with an engine speed, so as to improve a fuel consumption ratio of the engine. The fuel-cut operation is continued up to a moment when the engine speed lowers to a certain value or less because an engine stall occurs if the engine speed excessively lowers due to the fuel-cut operation, thereafter the fuel-supply for the engine is restarted.

In case of a known automotive vehicle mounted with both a fluid drive device with a lock-up clutch and an engine with a fuel-cut device, a fuel consumption ratio is further improved by jointly using a fuel-cut operation and a lock-up operation. In such type of automotive vehicle under a high vehicle speed and a large oil discharge of an oil pump, a coasting lock-up operation wherein the fuel-cut and lock-up operations are simultaneously performed is carried out. Moreover, if a lock-up operation is changed from an usual lock-up operation with no fuel-cut operation to the coasting lock-up operation with a fuel-cut operation causing lowering of a vehicle speed, the coasting lock-up operation is continued while coordinates of the vehicle speed and a throttle valve opening degree are still in the lock-up area.

For further improving the fuel consumption ratio, it is desirable to perform the coasting lock-up operation for a low vehicle speed. Particularly, when up-shifting is performed due to an accelerator pedal being in the accelerator-off state, it is desirable to perform a lock-up operation. However, in the known automotive vehicle in low vehicle speed, changing from non-locking-up state to a coasting locking-up state cannot be performed because an oil discharge amount of an oil pump is less than that in high vehicle speed and thereby an influence of a centrifugal oil pressure increases as described later. Moreover, since the coasting lock-up operation cannot be performed in a low vehicle speed, the engine speed may decrease to a speed equal to or lower than a speed in which a fuel-cut operation can be performed, and thereby even a fuel-cut operation cannot be performed in some cases.

Therefore, even if a lock-up operation is tried in accordance with a lock-up command under such an accelerator-off state, the lock-up operation is hardly made or fails due to an influence of the centrifugal oil pressure, so that a lock-up operation under the accelerator-off state (a coasting lock-up operation) cannot be realized. Thus, in a known control system for a lock-up clutch of a fluid drive device, the lock-up operation of the lock-up clutch is inhibited under the accelerator-off state.

An influence of the centrifugal oil pressure is described below by referring to FIG. 3c. In the automotive vehicle mounted with both a fluid drive device with a lock-up clutch and an engine with a fuel-cut device, at a moment when a lock-up solenoid for operating the lock-up clutch is changed from "off" to "on" depending on a lock-up command generated after the vehicle became in the accelerator-off state, an engine speed Ne has become lower than a turbine speed Nt of the fluid drive device (i.e. Ne<Nt) due to a fuel-cut operation, contrarily to the relation between these speeds at the moment when the vehicle became in the accelerator-off state. In this state wherein Ne<Nt, an oil pressure Pa in an applying-chamber of the fluid drive device is larger than an oil pressure Pr in a releasing-chamber of the fluid drive device (i.e. Pr>Pa) taking into account an action of the centrifugal oil pressure because the centrifugal oil pressure generated in the applying chamber is proportional to Ne2 while the centrifugal oil pressure generated in the releasing chamber is proportional to {(Ne+Nt)/2}2. Thus, a force for preventing a lock-up operation of the lock-up clutch is generated due to the differential pressure (Pr–Pa), causing the above mentioned problem.

SUMMARY OF THE INVENTION

It is therefore an object of the present invention to provide an improved control system capable of realizing locking-up of the fluid drive device under the accelerator-off state, i.e. above-mentioned coasting lock-up operation, by increasing the engine speed to close the engine speed to the turbine speed as performing a lock-up operation by supplying fuel after the fuel-cut operation to reduce the differential pressure between the centrifugal oil pressures so that an operating oil pressure for the lock-up operation overcomes the differential pressure preventing the lock-up operation.

Briefly stated, the present invention provides a control system for an automatic transmission of an automotive vehicle. The transmission has fluid drive device with a lock-up clutch for locking-up the fluid drive device by mechanically engaging between input and output elements of the fluid drive device by a lock-up operation of the lock-up clutch. The lock-up operation of the lock-up clutch is performed in accordance with a lock-up command generated by the control system when coordinates of a vehicle speed and a condition relating to a torque of an engine is in a certain lock-up area determined in relation to the vehicle speed and the condition relating to the engine torque. The engine is being mounted on the vehicle and associated with the transmission and is capable of controlling an amount of fuel to be supplied independently of an accelerator pedal stepping degree.

The control system in accordance with the present invention comprises coasting state detecting means for detecting a coasting state of the vehicle from the condition relating to the engine torque, and further comprises fuel-supply increasing means for temporarily supplying an increased amount of fuel to the engine when coordinates of the vehicle speed and the condition relating to the engine torque enter into the lock-up area under a coasting state of the vehicle, which coasting state being detected by the coasting state detecting means.

With the control system in accordance with the present invention, when coordinates of the vehicle speed and the condition relating to the engine torque enter into the lock-up area under a coasting state of the vehicle detected by the coasting state detecting means, the fuel-supply increasing means temporarily supply an increased amount of fuel to the engine, which fuel-supply increases the engine speed close to the turbine speed, so as to reduce the differential pressure between the centrifugal oil pressures. Therefore, an operating oil pressure for the lock-up operation can overcome the differential pressure preventing the lock-up operation even if the vehicle is in a coasting state, so that above-mentioned coasting lock-up operation can be realized, which enables to obtain an improved fuel consumption ratio of the engine and a large braking force from the engine.

In another aspect, briefly stated, the present invention provides a control system for an automatic transmission of an automotive vehicle. The transmission has a fluid drive device with a lock-up clutch for locking-up the fluid drive device by mechanically engaging between input and output elements of the fluid drive device by a lock-up operation of the lock-up clutch. The lock-up operation of the lock-up clutch is performed in accordance with a lock-up command generated by the control system when coordinates of a vehicle speed and a condition relation to a torque of an engine are in a certain lock-up area determined in relation to the vehicle speed and the condition relating to the engine torque. The engine is mounted on the vehicle and associated with the transmission, and has fuel-cut means for cutting fuel-supply for the engine by a fuel-cut operation when the vehicle is in an accelerator-off state with the engine speed at a certain speed.

In this aspect, the control system in accordance with the present invention comprises coasting state detecting means for detecting a coasting state of the vehicle from the condition relating the engine torque, and further comprises fuel-supply restarting means for temporarily restarting fuel-supply with an increased amount of fuel to the engine relative to an amount of fuel to be supplied in a non-fuel-cutting coasting state after the fuel-cut operation of the fuel-cut means when coordinates of the vehicle speed and the condition relating to the engine torque enter into the lock-up area under a coasting state of the vehicle, which coasting state being detected by the coasting state detecting means.

With the control system in this aspect, in accordance with the present invention, when coordinates of the vehicle speed and the condition relating to the engine torque enter into the lock-up area under a coasting state of the vehicle detected by the coasting state detecting means, the fuel-supply restarting means temporarily restart fuel-supply with an increased amount of fuel to the engine relative to an amount of fuel to be supplied in a non-fuel-cutting coasting state after the fuel-cut operation of the fuel-cut means. The fuel-supply increases the engine speed close to the turbine speed, so as to reduce the differential pressure between the centrifugal oil pressures. Therefore, an operating oil pressure for the lock-up operation can overcome the differential pressure preventing the lock-up operation even if the vehicle is in a coasting state, so that above-mentioned coasting lock-up operation can be realized. This improves a fuel consumption ration of the engine and enables a large braking force from the engine. Further, the control system in this aspect can be provided by slightly modifying a prior control system.

In one embodiment of the present invention, the control system further comprises engine speed increase detecting means for detecting a moment when the engine speed is increased to a certain speed during coordinates of the vehicle speed and the condition relating to the engine torque are in the lock-up area, and the control system generates the lock-up command after a moment when the engine speed is increased to the certain speed during the coordinates are in the lock-up area, which moment being detected by the engine speed increase detecting means.

With the embodiment of the present invention, achievement of the coasting lock-up operation can be assured, and time from generating the lock-up command to finishing of the coasting lock-up operation can be shortened, providing efficient operation of the lock-up clutch and efficient use of a controller of the control system.

In another embodiment of the present invention, the fuel-supply restarting means perform the restarting of fuel-supply when the transmission finishes a changing operation of a speed ratio between input and output elements of the transmission, which changing operation being performed as the vehicle being in an accelerator-off state and other predetermined speed ratio changing conditions being satisfied.

With the embodiment of the present invention, a rapid start of the coasting lock-up operation can be achieved, providing a smooth and efficient lock-up operation.

The present invention will be explained in further detail hereinafter, by referring to two preferred embodiments shown in the accompanying drawings.

DETAILED DESCRIPTION OF THE PREFERRED EMBODIMENTS

Figure 1:
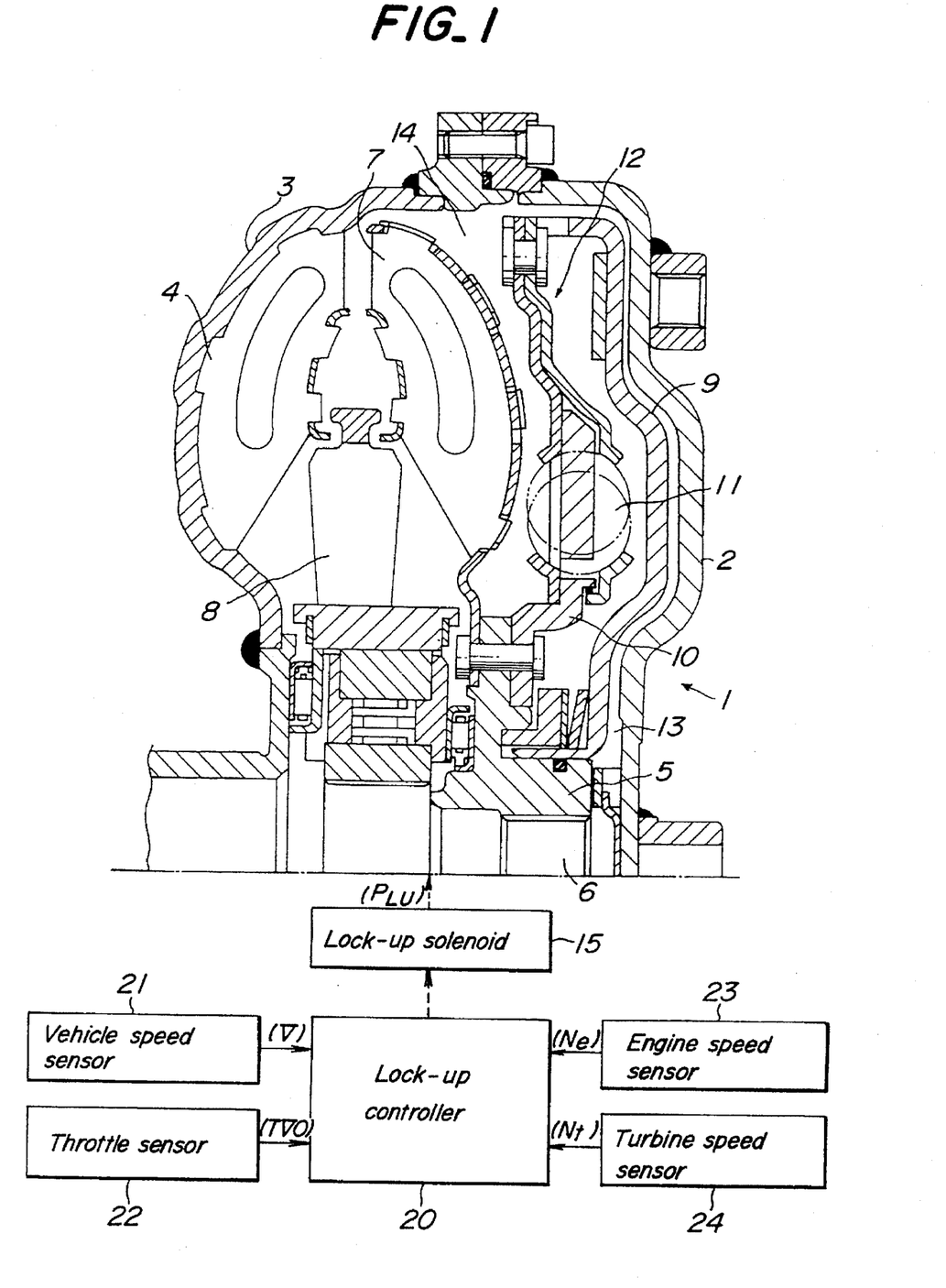
FIG. 1 is a schematic diagram showing a constitution of the control system in accordance with the first and second embodiments of the present invention.

Referring now to FIG. 1, there is shown one example of a torque converter serving as a fluid drive device for an automatic transmission (not shown) of an automotive vehicle, with which automatic transmission the control system in accordance with the present invention is associated.

The torque converter denoted as a whole by reference numeral 1 includes a pump impeller 4 secured to a shell 3 tightly connected to a converter cover 2, a turbine runner 7 drivably connected to an input shaft (not shown) of the automatic transmission through a turbine hub 5, and a stator 8 for directing operating oil flow in the torque converter 1 from the pump impeller 4 to the turbine runner 7. The stator 8 is supported by a stationary tubs (not shown) through a one-way clutch, which stationary tube extends coaxially with the transmission input shaft through a central bore 6 of the torque converter 1, and rotatably supports the converter cover 2 with the shell 3.

The torque converter 1 mentioned above has a basic structure, which is substantially the same as that disclosed in "Service manual for RE4R01A-Type Automatic Transmission" issued in March 1987, by Nissan Motor Co., Ltd., at Part I, pages 13–14, 28–30, 74–75, whose disclosure is incorporated herein by reference.

The torque converter 1 thus further includes a lock-up clutch 12 for locking-up the torque converter 1 by mechanically engaging the converter cover 2 and the turbine hub 5 corresponding to input and output elements of the torque converter I, respectively. The lock-up clutch 12 has a lock-up piston 9 axially slidably and drivably connected to the transmission input shaft through the turbine hub 5 and a torsional damper 10 into which a torsion spring 11 is inserted.

A releasing chamber 13 is defined between the lock-up piston 9 and the converter cover 2, while an applying chamber 14 is defined between the lock-up piston 9 and the shell 3 inside the torque converter 1. The releasing chamber 13 and the applying chamber 14 are connected to each other at an outer periphery of the lock-up piston 9 in a releasing state (non-locking-up state) of the torque converter 1 shown in FIG. 1.

The torque converter 1 with a lock-up clutch 12 assumes a locking-up state and the above-mentioned releasing state in accordance with an ON/OFF operation of a lock-up solenoid 15 of the control system of the present invention, which lock-up solenoid 15 controls a lock-up operating oil pressure PLU for adjusting an applying pressure Pa in the applying chamber 14 and a releasing pressure Pr in the releasing chamber 13. In the locking-up state of the torque converter 1, the lock-up piston 9 is urged by the applying pressure Pa to abut against and frictionally engage with the converter cover 2. On the other hand, in the releasing state of the torque converter 1, the lock-up piston 9 is urged by the releasing pressure Pr to separate from the converter cover 2.

The control system of the present invention further comprises a lock-up controller 20 including a microprocessor for controlling lock-up and releasing operations of the lock-up clutch 12 to change a state of the torque converter 1 between the locking-up state and the releasing state. The lock-up controller 20 performs the above-mentioned control of the lock-up clutch 12, on the basis of an input signal from a vehicle speed sensor 21 for detecting a vehicle speed V, an input signal from a throttle sensor 22 for detecting a throttle valve opening degree TVO corresponding to an accelerator pedal stepping degree, an input signal from an engine speed sensor 23 for detecting an output element rotating speed Ne (engine speed) of an engine (not shown) mounted on the vehicle and associated with the automatic transmission, and an input signal from a turbine speed sensor 24 for detecting a rotating speed Nt of the turbine runner 7, in the manner to be particularly mentioned hereinafter.

The lock-up controller 20, in this embodiment, further serves as a speed-change controller to control a speed ration changing operation of the transmission for changing a speed ratio between input and output elements of the transmission, by operating shift solenoids (not shown) in a manner as known per se, and from, e.g. the above-cited "Service manual for RE4R01A-Type Automatic Transmission".

Figure 4:
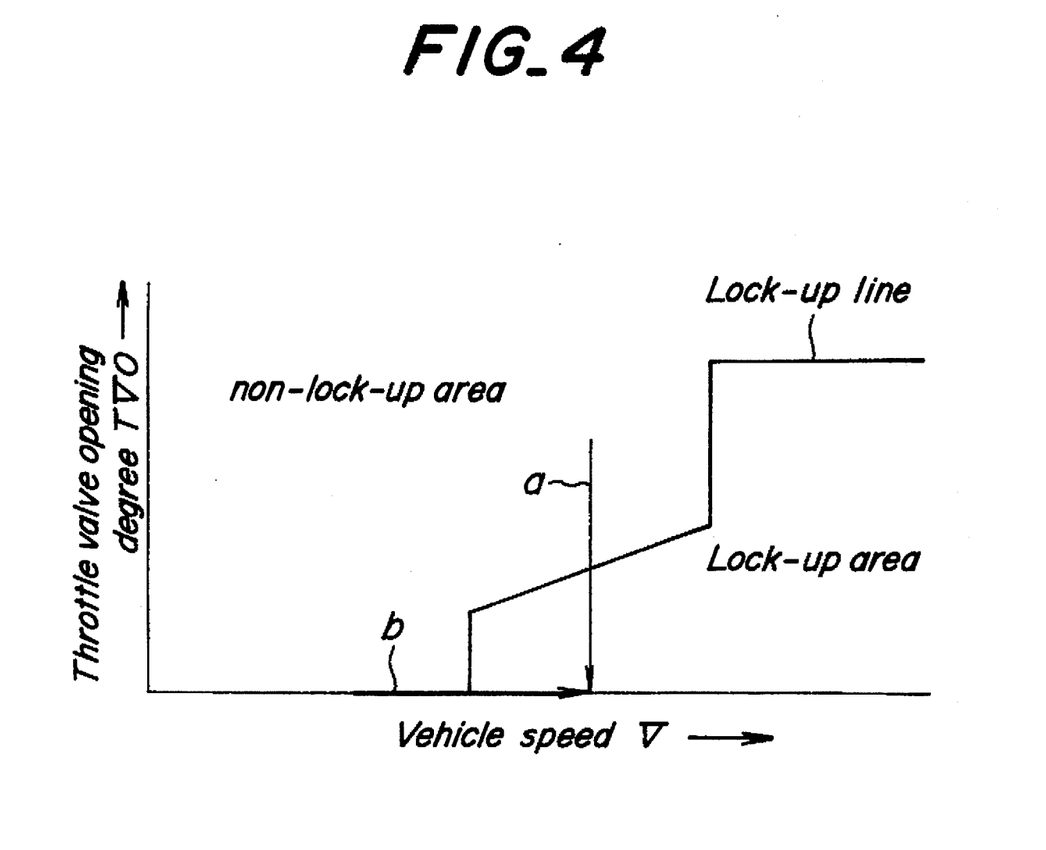
FIG. 4 is a diagram showing a lock-up map including a lock-up area, which lock-up map is used for the first and second embodiments.

The lock-up controller 20 has a previously stored lock-up map as shown in FIG. 4, in which map a lock-up area and a non-lock-up area are determined in relation to a vehicle speed V and a throttle valve opening degree TVO substantially corresponding to an output torque of the engine. The lock-up controller 20 is programmed to execute a control program shown in FIG. 2, based on the above-mentioned input signals and the lock-up map, so as to control the lock-up clutch 12 and further to generate a fuel-cut command signal and a fuel-supply restart command signal for an engine controller (not shown). The engine controller controls an opening degree of an ISC (Idling Speed Control) valve (not shown) for the engine apart from the accelerator pedal stepping degree, in accordance with the command signals to adjust a supply amount of fuel for executing fuel-cut and fuel-supply restart operations, so that the engine controller corresponds to the fuel-cut means.

Figure 2:
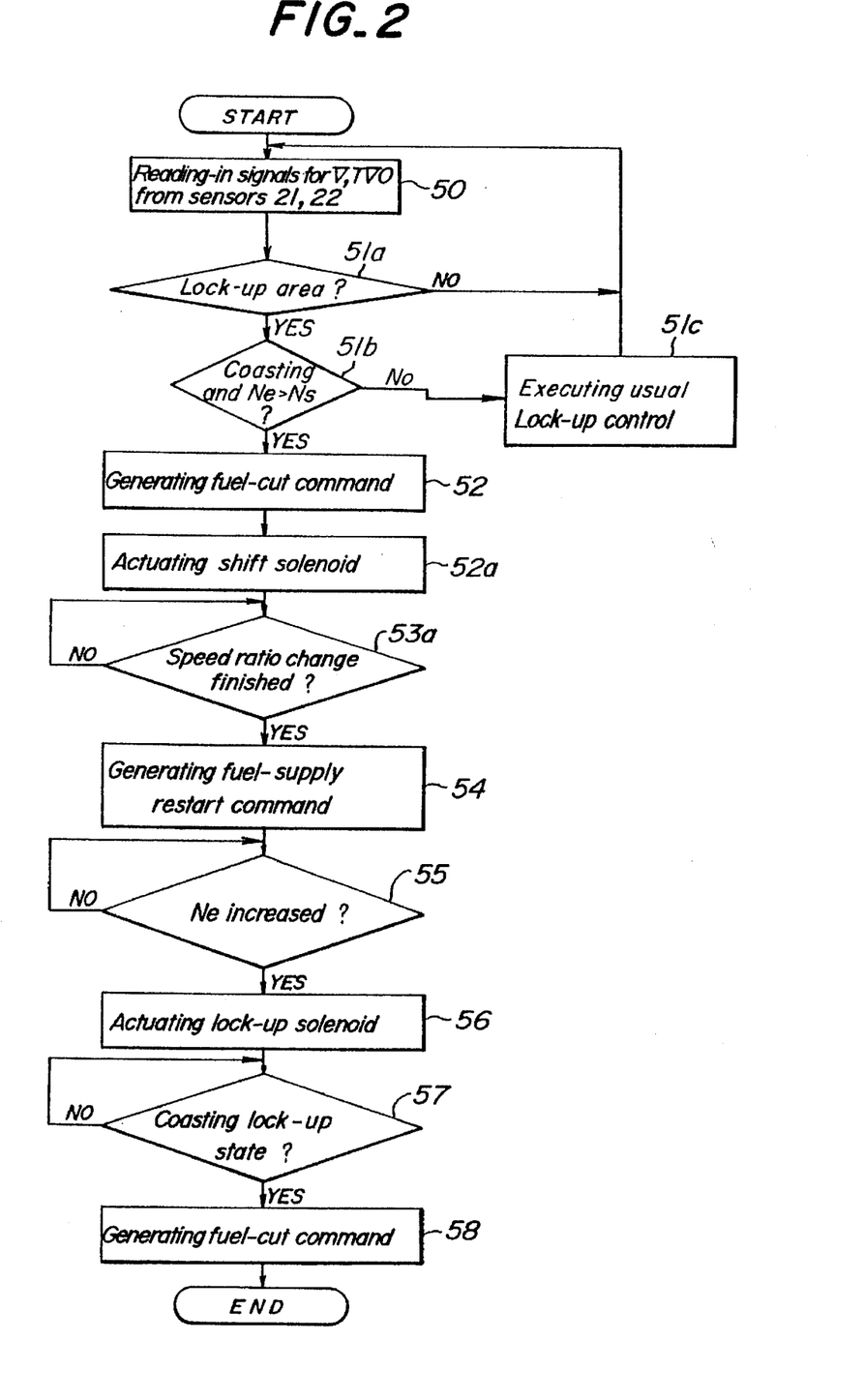
FIG. 2 is a flow chart showing a control program for a lock-up control, which program is repeated on every predetermined cycle by a controller forming a part of the control system in the first embodiment.

The control program in FIG. 2, repeated on every predetermined cycle, is applied in case of when coordinates of a vehicle speed V and a throttle valve opening degree TVO enter the lock-up area, crossing a lock-up line parting off the lock-up area from the non-lock-up area as shown by an arrow "a" in FIG. 4, by at least decreasing of the throttle valve opening degree TVO.

Referring to FIG. 2, the signals from the sensors 21, 22 indicating a current vehicle speed V and a current throttle valve opening degree TVO are read-in at a step 50, and a determination is made at a subsequent step 51a as to whether or not coordinates of the current vehicle speed V and the current throttle valve opening degree TVO belong to the lock-up area shown in FIG. 4. When the result of the determination at the step 51a is that the coordinates of the current vehicle speed V and the current throttle valve opening degree TVO belong to the non-lock-up area, the control procedure returns to the step 50. When, on the other hand, the result of the determination at the step 51a is that the coordinates of the current vehicle speed V and the current throttle valve opening degree TVO belong to the lock-up area, the control procedure is progressed to a step 51b.

At the step 51b, a determination is made from the current throttle valve opening degree TVO as to whether or not the vehicle is in a coasting state i.e. an accelerator-off state, where an accelerator pedal is fully released and the throttle valve is fully closed and the detected engine speed Ne is greater than a predetermined engine speed Ns. Therefore, the lock-up controller 20 corresponds to the coasting state detecting means. When the result of the determination at the step 51b is that the vehicle is not in the coasting state or that the detected engine speed Ne is not greater than the predetermined engine speed Ns, the control procedure is progressed to a step 51c wherein an usual lock-up control is executed in a manner as known per se, and from, for example the above-cited "Service manual for RE4R01A-Type Automatic Transmission", then returns to the step 50. When, on the other hand, the result of the determination at the step 51b is that the vehicle is in the coasting state and the detected engine speed Ne is greater than the predetermined engine speed Ns, the fuel-cut command signal is generated at a step 52 toward the engine controller to make the ISC valve "close" so that fuel-supply to the engine is stopped.

Figure 3A:
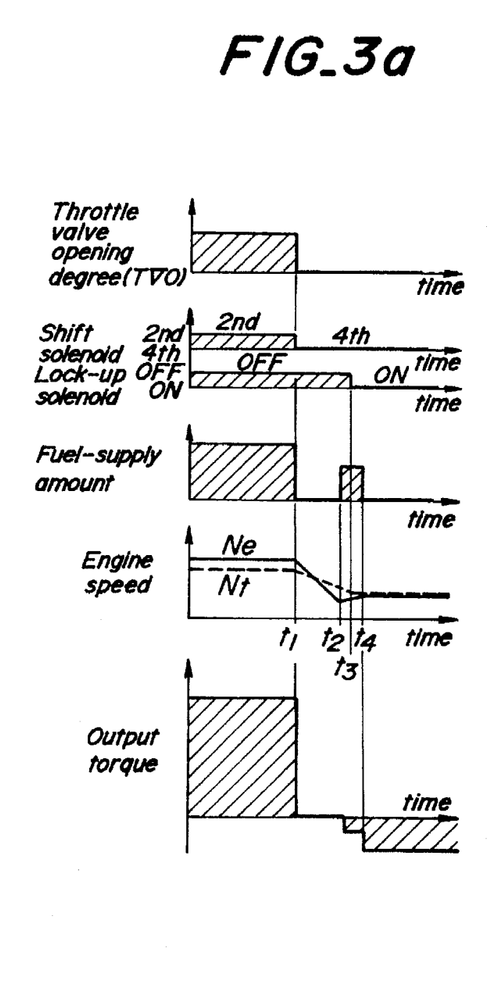
FIGS. 3a and 3b are operation time charts of the first and second embodiments of the present invention and FIG. 3c is an operation time chart of a prior control system for fuel-cut and lock-up operations.
Figure 3B:
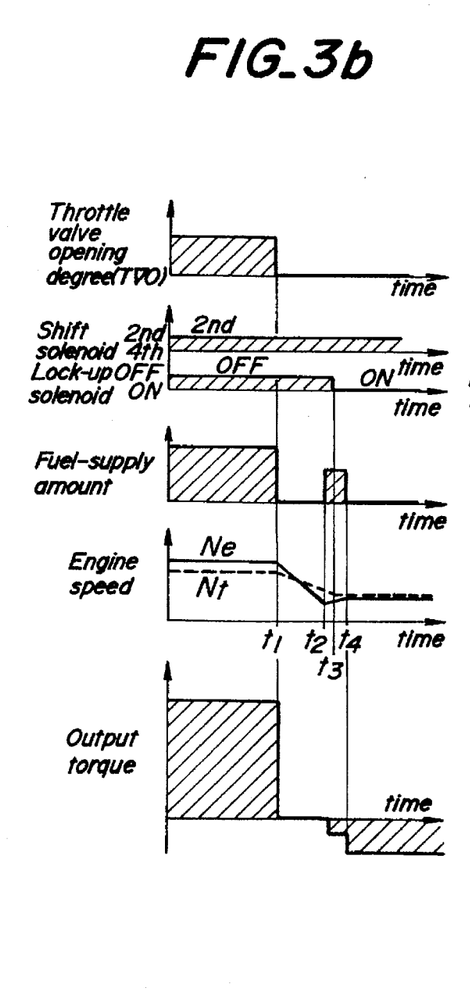

At a subsequent step 52a, the shift solenoids of the control system are operated for changing the speed ration of the transmission, which changing operation is to be performed due to the vehicle becoming in an accelerator-off state and other predetermined speed ration changing conditions being satisfied, in a manner as known per se, for example the above-cited "Service manual for RE4R01A-Type Automatic Transmission". In this embodiment, as shown in FIG. 3a, the changing operation at the step 52a is executed as a speed change from second speed to fourth speed.

Then, at a subsequent step 53a, a determination is made as to whether or not the 2nd-to-4th speed changing operation is finished, which determination can be made on the basis of, for example the current turbine speed Nt and the current vehicle speed V read-in from the sensors 24, 21 because each of Nt and V corresponds to each rotating speed of the input and output elements of the transmission, so that when the speed ratio arrives at a certain value of the fourth speed the current turbine speed Nt and the current vehicle speed V indicate the arrival. Instead of the determination on the bases of Nt and V from the sensors 24, 21, at the step 53a, it is also possible to perform a timer control regarding the speed changing operation as being finished when a predetermined time passes from operating of the shift solenoids by a shift command signal. During the result of the determination at the step 53a is that the changing operation is not finished, the control procedure repeats to return to the step 53a in the self loop. When, on the other hand, the result of the determination at the step 53a is that the changing operation is finished, the control procedure is progressed to a subsequent step 54.

At the step 54, the fuel-supply restart command signal is generated toward the engine controller to make the ISC valve "open" so that fuel-supply to the engine is temporarily restarted with a predetermined supply amount of fuel. Therefore, the lock-up controller 20 corresponds to the fuel-supply increasing means and the fuel-supply restarting means. In this case, the predetermined supply amount is set to a value much larger than an initial supply amount for restarting fuel-supply for a non-fuel-cutting coasting state at the moment when the current engine speed Ne is approximately equalized to the current turbine speed Nt in a prior control system as shown in FIG. 3c. The temporary supply of a larger amount of fuel causes rapid and enough increase of the engine speed Ne. Therefore, an engine speed Ne corresponding to a vehicle speed V can be obtained from the temporary restart of fuel-supply at the predetermined supply amount of fuel.

Then, at a subsequent step 55, a determination in made as to whether or not the current engine speed Ne is increased to a predetermined speed due to the temporary restart of fuel-supply. Therefore, the lock-up controller 20 corresponds to the engine speed increase detecting means. The determination can be made on the basis of the current engine speed Ne read-in from the sensor 23. In this case, the predetermined speed is set as an engine speed by which the lock-up operating oil pressure PLU for the lock-up operation can overcome the differential pressure between a centrifugal oil pressure proportional to Ne2 generated in the applying chamber 14 of the torque converter 1 and a centrifugal oil pressure proportional to $\{(Ne+Nt)/2\}2$ generated in the releasing chamber 13 of the torque converter In other words, an engine speed by which locking-up of the torque converter 1 can occur when the lock-up solenoid 15 is operated. Instead of the determination on the basis of Ne from the sensor 23, it is also possible to perform a timer control regarding the engine speed Ne as increased up to the predetermined speed when a predetermined time passes from generating of the fuel-supply restart command signal. During the result of the determination at the step 55 is that the current engine speed Ne is not increased to the predetermined speed, the control procedure repeats to return to the step 55 in the self loop. When, on the other hand, the result of the determination at the step 55 is that the current engine speed Ne is increased to the predetermined speed, the control procedure is progressed to a subsequent step 56. At the step 56, the lock-up controller 20 actuates the lock-up solenoid 15 so that the lock-up solenoid 15 becomes "ON".

At a subsequent step 57, a determination is made as to whether or not the torque converter 1 is in a locking-up state under the accelerator-off state (i.e. the coasting locking-up state) due to the operation of the lock-up solenoid 15. The determination is made, in this embodiment, on the basis of that current speed of input and output elements of the torque converter 1 being equalized. In this case, the speed of input element of the torque converter 1 is obtained from the engine speed Ne, while the speed of output element of the torque converter 1 is obtained by inversely calculating from the vehicle speed V in accordance with the speed ratio brought by the changing operation at the step 52a. However, it is possible to utilize a speed sensor for an output element of the torque converter 1. During the result of the determination at the step 57 is that the torque converter 1 is not in the coasting locking-up state, the control procedure repeats to return to the step 57 in the self loop. When, on the other hand, the result of the determination at the step 57 is that the torque converter 1 is in the coasting locking-up state, the control procedure is progressed to a subsequent step 58. At the step 58, the fuel-cut command is regenerated toward the engine controller, so that fuel-supply to the engine is stopped due to "close" of the ISC valve.

Referring to FIG. 3a, functions of the first embodiment are explained below. When it is determined that coordinates of the current vehicle speed V and the current throttle valve opening degree TVO belong to the lock-up area and the vehicle is in the coast state before a moment t1, an amount of fuel to be supplied to the engine (e.g. injection amount of fuel) comes to 0 and the shift solenoids are changed from, for example, states for second speed to states for fourth speed, then the engine speed Ne gradually decreases, and resultingly Ne becomes equal to the turbine speed Nt and thereafter Ne gets smaller than Nt. In the state of Ne<Nt, when it is determined that the speed ratio changing operation is finished at a moment t2, if coordinates of the current vehicle speed V and the current throttle valve opening degree TVO belong to the lock-up area, fuel-supply to the engine is restarted with the predetermined supply amount of fuel, so that the engine speed Ne changes from decreasing to increasing.

When the engine speed Ne reaches the predetermined speed at a moment t3 due to the increase of the engine speed Ne, a state wherein the lock-up operating oil pressure overcomes the differential pressure between the centrifugal pressures in the applying chamber 14 and the releasing chamber 13 enabling lock-up operation of the lock-up clutch 12 is achieved, as mentioned above. Therefore, the lock-up solenoid 15 is changed from "off" to "on" in accordance with the lock-up command at the moment t3, and thereafter the coasting locking-up state is achieved at a moment t4 when Ne is equal to Nt. Once the vehicle becomes in the coasting locking-up state, the fuel-cut operation is performed again from the moment t4 because fuel-supply becomes unnecessary.

Thus, with the first embodiment of the present invention, it is possible to realize the coasting lock-up operation that has been difficult for a prior control system in case of up-shift speed change, e.g. the 2nd-to-4th speed change, due to the vehicle becoming in the accelerator-off state as shown by the arrow "a" in FIG. 4. This coasting lock-up operation improves fuel consumption ratio of the engine and enables a large braking force from the engine.

Figure 3C:
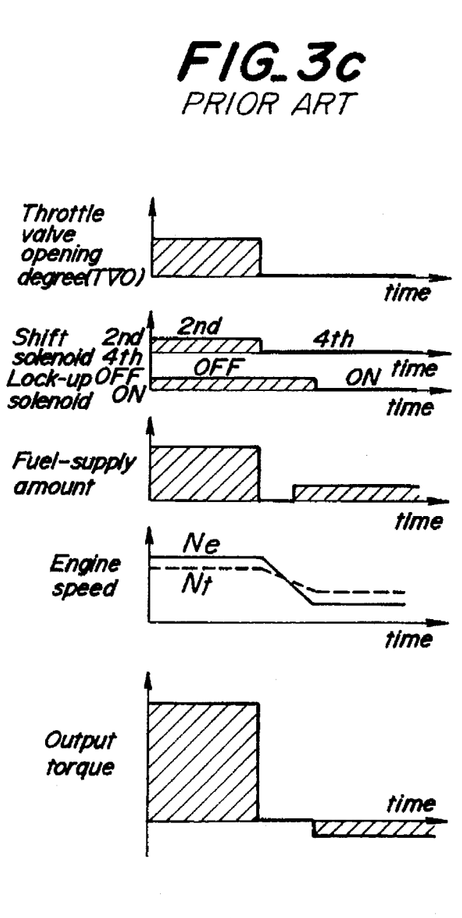

Furthermore, with this embodiment, because the supply amount is set to a value much larger than an initial supply amount for restarting fuel-supply for a non-fuel-cutting coasting state at the moment when the current engine speed Ne is approximately equalized to the current turbine speed Nt in a prior control system as shown in FIG. 3c, it is possible to realize a state ready for the lock-up operation in a short time owing to a rapid increase of the engine speed to a speed close to the turbine speed by the temporarily restarting fuel-supply. Furthermore, because fuel-supply is stopped again from the coasting locking-up moment t4 owing to no necessity of fuel-supply, more improved fuel consumption ratio of the engine can be obtained.

Figure 5:
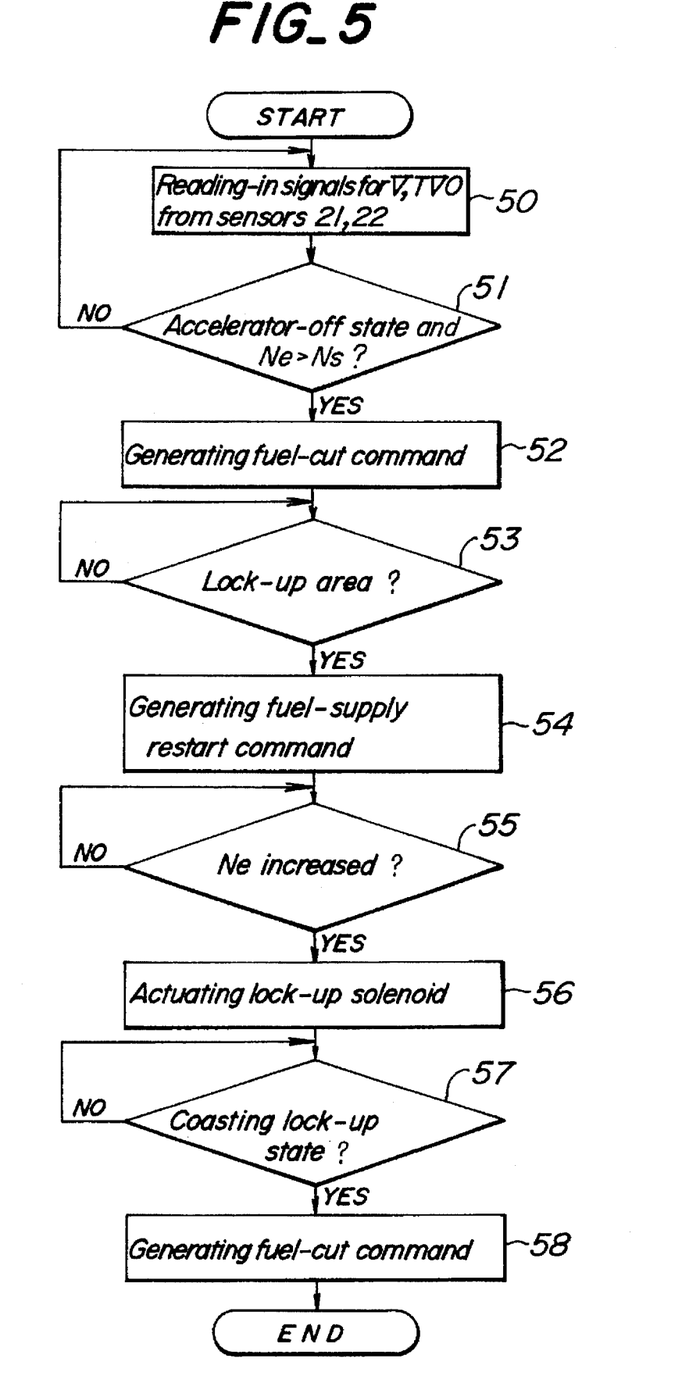
FIG. 5 is a flow chart showing a control program for a lock-up control, which program is repeated on every predetermined cycle by a controller forming a part of the control system in the second embodiment.

FIG. 5 is a flow chart showing a control program executed by the lock-up controller 20 as a controller forming a part of the control system in the second embodiment in accordance with the present invention. Because the control system of the second embodiment is constituted similar to the control system of the first embodiment, similar parts are indicated by the same reference in the embodiments.

The control program in FIG. 5, repeated on every predetermined cycle, is applied in case of when coordinates of a vehicle speed V and a throttle valve opening degree TVO enter the lock-up area, crossing a lock-up line parting off the lock-up area from the non-lock-up area as shown by e.g. an arrow "b" in FIG. 4, by increasing of the vehicle speed V in the accelerator-off state of the vehicle.

Referring to FIG. 5, the signals from the vehicle speed sensor 21 and the throttle sensor 22 indicating a current vehicle speed V and a current throttle valve opening degree TVO are read-in at a step 50, and a determination is made at a subsequent step 51 from the current throttle valve opening degree TVO as to whether or not the vehicle is in the accelerator-off state and the detected engine speed Ne is greater than the predetermined engine speed Ns. During the result of the determination at the step 51 is that the vehicle is not in the accelerator-off state or that the detected engine speed Ne is not greater than the predetermined engine speed Ns, the control procedure repeats to return to the step 50. When, on the other hand, the result of the determination at the step 51 is that the vehicle is in the accelerator-off state and the detected engine speed Ne is greater than the predetermined engine speed Ns, the fuel-cut command signal is generated at a step 52 toward the engine controller to make the ISC valve "close" so that fuel-supply to the engine is stopped.

At a subsequent step 53, a determination is made as to whether or not coordinates of the current vehicle speed V and the current throttle valve opening degree TVO belong to the lock-up area shown in FIG. 4 after the fuel-cut operation. During the result of the determination at the step 53a is that the coordinates of the current vehicle speed V and the current throttle valve opening degree TVO belong to the non-lock-up area, the control procedure returns to the step 53 in the self loop. When, on the other hand, the result of the determination at the step 53 is that the coordinates of the current vehicle speed V and the current throttle valve opening degree TVO belong to the lock-up area, the control procedure is progressed to a step 54. The control procedure below the step 54 is the same as that of the first embodiment, so that further description of the steps is omitted.

Therefore, the lock-up controller 20 in this embodiment corresponds to the coasting state detecting means, the fuel supply-restarting means, the fuel-supply increasing means and the engine speed increase detecting means.

Thus, with the second embodiment of the present invention, it is possible to realize the coasting lock-up operation which has been difficult for a prior control system in case of the vehicle running down on a downward-sloping road in the accelerator-off state as shown by the arrow "b" in FIG. 4. This coasting lock-up operation also enables to obtain an improved fuel consumption ratio of the engine and a large braking force from the engine suitable for running down the downward-sloping road.

It is of course that the present invention is not limited to the above-mentioned specific embodiments only, and various modification and/or alterations may be made without departing from the scope of the invention.

We claim:

1. A control system for an automatic transmission of an automotive vehicle, where the transmission has a fluid drive device with a lock-up clutch for locking-up the fluid drive device by mechanically engaging input and output elements of the fluid drive device by a lock-up operation of the lock-up clutch, which lock-up operation of the lock-up clutch being performed in accordance with a lock-up command generated by the control system when a combination of a detected vehicle speed and a detected throttle valve opening degree is in a lock-up area predetermined in relation to the vehicle speed and the throttle valve opening degree, wherein the transmission is associated with an engine mounted on the vehicle, fuel supply to the engine being controllable independently of an accelerator pedal stepping degree, which corresponds to the throttle valve opening degree, said control system comprising:

coasting state detecting means for detecting a coasting state of the vehicle from the detected throttle valve opening degree; and fuel-supply increasing means for temporarily supplying an increased amount of fuel to the engine to enable the lock-up clutch to lock-up when a combination of the detected vehicle speed and the detected throttle valve opening degree enters into the lock-up area under the coasting state detected by the coasting state detecting means.

2. A control system for an automatic transmission of an automotive vehicle, where the transmission has a fluid drive device with a lock-up clutch for locking-up the fluid drive device by mechanically engaging input and output elements of the fluid drive device by a lock-up operation of the lock-up clutch, which lock-up operation of the lock-up clutch being performed in accordance with a lock-up command generated by the control system when a combination of a detected vehicle speed and a detected throttle valve opening degree is in a lock-up area predetermined in relation to the vehicle speed and the throttle valve opening degree, wherein the transmission is associated with an engine mounted on the vehicle and the engine having fuel-cut means for cutting off fuel-supply to the engine by a fuel-cut operation when the vehicle is in an accelerator-off state based on an accelerator pedal stepping degree, which corresponds to the throttle valve opening degree, and the detected engine speed is over a predetermined engine speed, said control system comprising:

coasting state detecting means for detecting a coasting state of the vehicle from the detected throttle valve opening degree; and fuel-supply restarting means for temporarily restarting fuel-supply with an increased amount of fuel to the engine relative to an amount of fuel to be supplied in a non-fuel-cutting coasting state after the fuel-cut operation of the fuel-cut means to enable the lock-up clutch to lock-up when a combination of the detected vehicle speed and the detected throttle valve opening degree enters into the lock-up area under the coasting state detected by the coasting state detecting means.

3. A control system as set forth in claim 1, wherein said control system includes engine speed increase detecting means for detecting a moment when the detected engine speed is increased to a predetermined lock-up enabling speed during a combination of the detected vehicle speed and the detected throttle valve opening degree is in the lock-up area, and wherein said control system generates the lock-up command after a moment when the detected engine speed is increased to the predetermined lock-up enabling speed during the combination of the detected vehicle speed and the detected throttle valve opening degree falls in the lock-up area, which moment being detected by the engine speed increase detecting means.

4. A control system as set forth in claim 2, wherein said control system includes engine speed increase detecting means for detecting a moment when the detected engine speed is increased to a predetermined lock-up enabling speed during a combination of the detected vehicle speed and the detected throttle valve opening degree is in the lock-up area, and wherein said control system generates the lock-up command after a moment when the detected engine speed is increased to the predetermined lock-up enabling speed during the combination of the detected vehicle speed and the detected throttle valve opening degree falls in the lock-up area, which moment being detected by the engine speed increase detecting means.

5. A control system as set forth in claim 2, wherein said fuel-supply restarting means restart fuel-supply when the transmission finishes a changing operation of a speed ratio between input and output elements of the transmission, which changing operation being performed as predetermined speed ratio changing conditions including an accelerator-off state of the vehicle being satisfied.

* * * * *